United States Patent [19]

Schick

[11] Patent Number: 4,995,542

[45] Date of Patent: Feb. 26, 1991

[54] STAPLING APPARATUS FOR FIXING JUNCTION STAPLES ON THE END OF A CONVEYOR BELT OR THE LIKE

[75] Inventor: Jean-Francois Schick, Paris, France

[73] Assignee: GORO S.A., Chelles, France

[21] Appl. No.: 506,339

[22] Filed: Apr. 9, 1990

[30] Foreign Application Priority Data

Apr. 21, 1989 [FR] France ................................ 89 05325

[51] Int. Cl.5 ............................ B25C 1/04; B25C 5/16
[52] U.S. Cl. ..................................... 227/112; 227/155
[58] Field of Search ............................... 227/112, 155

[56] References Cited

U.S. PATENT DOCUMENTS 3,581,350  6/1971  McComb ........................ 227/120 X
4,424,929  1/1984  Weis ................................ 227/120 X

FOREIGN PATENT DOCUMENTS 0022007  1/1981  European Pat. Off. .
1136079  5/1957  France .
2507275  12/1982  France .
2590955  6/1987  France .
2202605  9/1988  United Kingdom .

Primary Examiner—Timothy V. Eley
Attorney, Agent, or Firm—Young & Thompson

[57] ABSTRACT

A stapler apparatus for fastening junction staples (2) on one end of a conveyor belt (1) comprises a working head (10) slidable along a guide plate (7) provided for guiding the fastener clamps (4) of the staples to be fastened on one end of the conveyor belt (1). The working head (10) comprises a punch (13) for driving-in the clamps (4) and a mobile die (11) for folding down the clamp spikes. The support (25) of the die (11) and the punch (13) are driven through a sliding member (22) slidable inside the working head (10), this member (22) being driven by the piston (23) of an actuating cylinder (24). The sliding member (22) comprises two separate cams (33 and 36) acting respectively upon the support (25) of the movable die (11) and upon the clamp-driving punch (13), the arrangement and the profile of these cams being such that the first cam (33) will act at first for lowering the movable die (11) before the second cam (36) acts for raising the clamp-driving punch (13).

7 Claims, 3 Drawing Sheets

STAPLING APPARATUS FOR FIXING JUNCTION STAPLES ON THE END OF A CONVEYOR BELT OR THE LIKE

This invention relates to a stapling apparatus for fixing a row of junction staples on the end of a conveyor belt or the like.

FIELD OF THE INVENTION

The invention relates, more specifically, to the fixation of staples or clasps of the type formed of U-shaped elements adapted for being placed astride the end of a conveyor belt or the like and for being affixed thereto by means of clamps made of metal wire, such clamps having the shape of an inverted U. This fastening operation is achieved by punching these clamps through holes provided in both arms of the staples and by subsequently folding back the spikes of the clamps emerging out of the staple arms.

For facilitating the fixing of such staples, the staples present themselves initially with a V-shaped open configuration, with one of their arms spread apart out of its normal position. In this situation, after the end of a belt or similar article has been inserted between the staples of the row which is to be fixed in place, the staple arm which was initially raised for opening the staple must first be folded back before proceeding with the punching operation for driving the clamps through the staples and for folding back the spikes of the clamps.

PRIOR ART

There are at present existing a certain number of devices designed for carrying out these various operations. Thus, French Patent No. 2,590,955 discloses an apparatus intended for fixing on the end of a conveyor belt a row of linking staples provided with fastening clamps placed in a waiting position. This apparatus comprises a working head which is slidably mounted alongside a plate adapted for serving as a support for the end of a conveyor belt and for the row of staples which will be fixed thereto. This working head comprises, on either side of the row of staples, a punch for driving the fastener clamps and a mobile die provided for folding down the clamp spikes, and also a lead pawl for moving forward the working head with a stepwise motion alongside the different staples which have to be affixed.

This apparatus is actuated manually by handling a lever, the swivelling of which controls sequentially the lowering of the upper mobile die for closing the staple which is to be fixed, and then the raising of the punch for driving the fastener clamps through the staple. However, this requires a very substantial physical effort by the operator, and this effort has to be repeated many times, depending on the number of staples to be fixed. In such conditions, the fixing of a row of staples is a strenuous and time-consuming task.

This is why the present invention has the purpose of providing an apparatus of the above-mentioned kind, which is however designed in such manner that the mobile tools of the working head will be actuated by a pneumatic or hydraulic cylinder. A solution of this kind has already been suggested in some devices intended for the same type of work. However, the devices proposed heretofore for this purpose are relatively complex and costly, whereas the apparatus of this invention is designed with relatively simple and inexpensive mechanisms.

SUMMARY OF THE INVENTION

The apparatus according to this invention, for fixing onto the end of a conveyor belt or the like a row of linking staples provided with fastener clamps held in a waiting position, comprises a working head slidably mounted on a guide plate provided for guiding said clamps, said head comprising, on either side of the row of staples to be fixed, a punch for driving said clamps through holes in said staples, and a mobile die for subsequently folding down the spikes of said clamps, said head further comprising a lead pawl for moving the working head with a stepwise motion along the row of staples.

The apparatus of the invention is essentially characterized in that:

the clamp-driving punch and the support of the mobile die are both driven by a sliding member slidably mounted inside the working head, said sliding member being driven by the piston of a pneumatic or hydraulic actuating cylinder;

the said sliding member comprises two separate cams for respectively driving the support of the mobile die and the clamp-driving punch, the arrangement and the profile of these cams being such that the first cam operates at first for driving the mobile die down, before the second cam raises the clamp-driving punch.

This means that the mechanism of the apparatus is relatively simple, although it is capable of carrying out the various operations automatically, without requiring a special effort from the operator, apart from the travel motion of the working head and the control for starting the operation of the working head.

According to another feature of the apparatus, the travel axis of the slide is parallel to the plane of the guide plate which is intended to serve as a support for the end of a conveyor belt, and, on another hand, this axis is perpendicular to the sliding axis of the working head along said guide plate.

According to a further feature, the piston of the actuating cylinder acts on the slide through the intermediary of a toggle linkage, the knuckle axis of which is linked through a small connecting rod to the body of the working head.

This arrangement has the advantage of providing a large reduction ratio in the transmission of efforts. As a result, it is possible to use an actuator cylinder having a relatively small power.

Further characteristics and advantages of the apparatus of the present invention will appear from the following detailed description, with reference to the appended drawings given merely by way of example.

DETAILED DESCRIPTION OF THE INVENTION

Figure 1:
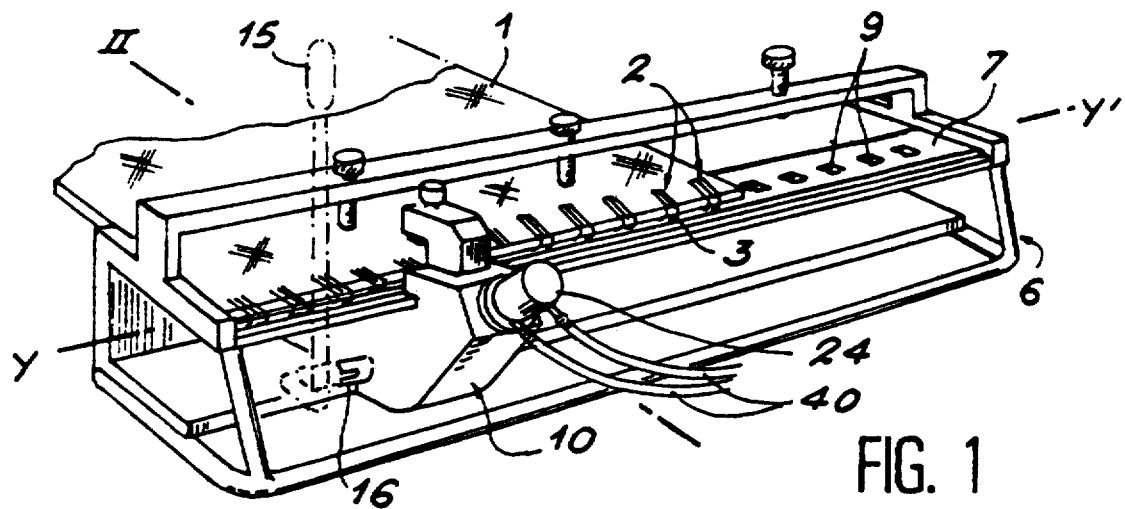
FIG. 1 is an overall perspective view of the apparatus of the invention.

As previously stated, the apparatus of the invention is designed for carrying out the various operations needed for fixing on the end of a conveyor belt 1 a row of staples 2 for joining said end with another end of this belt. The staples which are to be fixed in place are of the type constituted of U-shaped elements having two arms 2a and 2b linked together by knuckles 3 adapted for being joined by means of an elongated pin (not shown) with the knuckles of another similar row of joining staples, fixed on the other end of belt 1. One of the two arms of these staples, in this case arm 2a, carries two fixing clamps 4 made of metal wire, each of these clamps having the shape of an inverted U. These clamps are then mounted in a waiting position, which means that only their spikes are engaged inside through-holes provided in the arm 2a of the staples. These clamps are therefore protruding out of the staples (see FIG. 2). The opposite arm 2b of the staples presents an open shape, meaning that it is spread apart from its normal position in which it will subsequently be folded back to become parallel with the other arm 2a.

The present apparatus comprises a frame 6 carrying a plate 7 intended for serving as a support for the row of staples 2 which are to be fixed along the edge of belt 1. Therefore, the length of the frame 6 and of the plate 7 is slightly longer than the width of the belt 1, for allowing the end of this belt to be placed over plate 7 as shown in FIG. 1, the staples 2 being at that time placed astride the edge of belt 1.

Plate 7 has a further function, which is to serve as a guide for the clamps 4 when these will be pushed into place. For this purpose, the plate 7 comprises a row of openings 9 intended for receiving, in each one of them, the two clamps having been placed in a waiting position on the arm 2a of one specific staple. In this situation, the belt 1 and the row of staples 2 have to be placed in such manner that the staples 2 are oriented with their arm 2a underneath, so that the clamps 4 may be engaged inside the openings 9 of the guide plate 7. Also, this arrangement will determine a strictly accurate positioning of the staples 2.

Plate 7 also serves as a guiding rail for the movable working head of the apparatus, this head being generally designated as 10. It can be moved along the whole width of the conveyor belt 1 for fixing, one after the other, the various staples 2 which are to be set on the end of the belt.

On either side of the position of the row of staples 2, the working head 10 comprises two groups of tools provided for acting on the staples and on their fastener clamps 4, namely:

a movable die 11 located above the row of staples 2;

two punches 13 and 14 located below the row of staples 2, these punches being movable vertically and intended for becoming engaged through two adjacent openings 9 of the plate 7.

Preferably, the working head 10 is designed for acting on the fastener clamps 4 of two adjacent staples 2 in two different operating stages of the fixation of these clamps, in the same way as in the apparatus described in French Patent No. 2,590,955 referred to hereinabove.

This is the reason why there are provided two separate punches 13 and 14 under the row of staples 2. The first punch 13 is intended for driving in the two fastener clamps 4 of one staple 2, while the second punch 14 is provided for serving as an anvil against which will rest the two clamps 4 of the previous staple 2, during the final crimping down of the spikes of those clamps, after these spikes have previously been partly folded back during the initial driving in of the corresponding clamps 4. The die 11 comprises two separate groups of grooves located in registry with the spikes of the clamps of the two adjacent staples 2. The grooves of the first group are slanted for performing an initial folding of the spikes of the corresponding clamps, for instance over 45°. The grooves in the second group are shallow for performing the final crimping of the spikes of the clamps of the previous staple 2.

The movable working head 10 also comprises means adapted for immobilizing this head in each of its successive operating positions, that is in every position where the working head is suitably placed for driving-in the fastener clamps 4 through one determined staple 2 and for carrying out the final crimping of the spikes of the clamps 4 over the previous staple 2.

Figure 4:
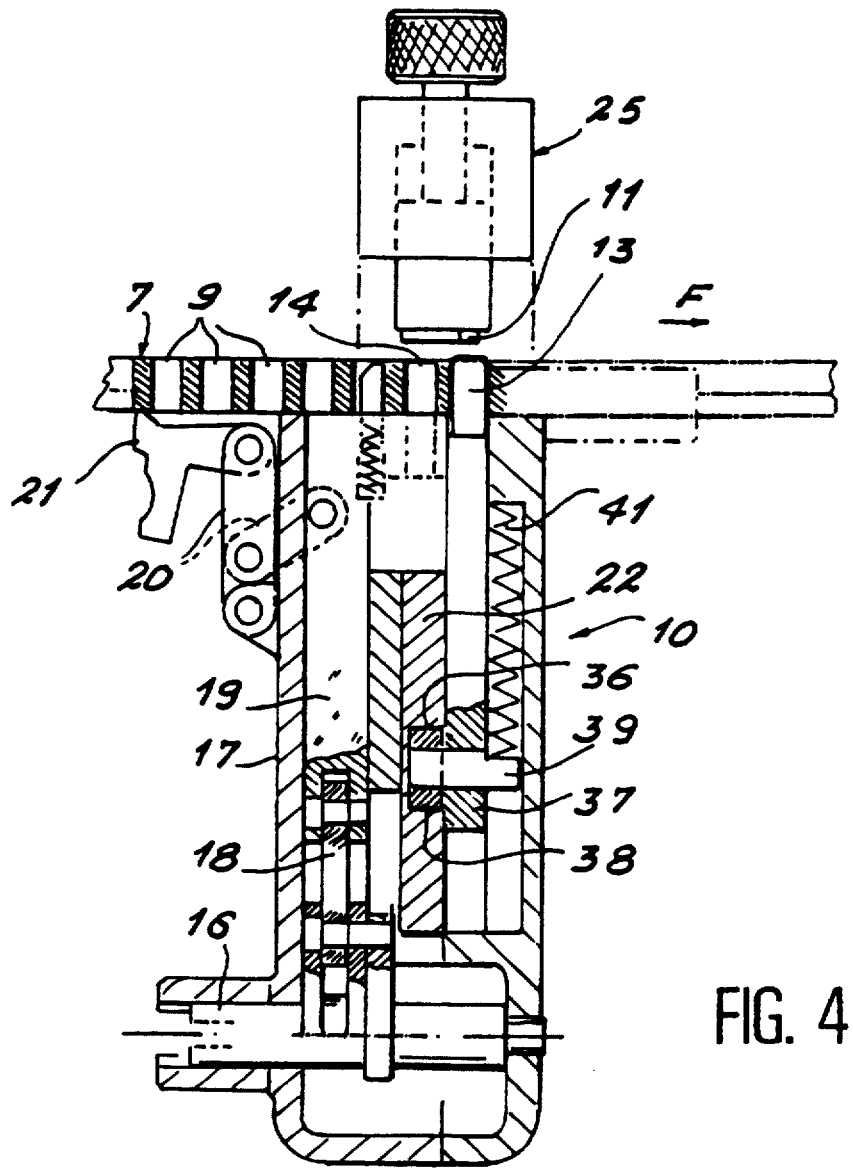
FIG. 4 is a longitudinal cross-section of the working head of the apparatus, taken along line IV—IV of FIG. 2.

In the example illustrated in FIG. 4, the working head 10 is immobilized in each one of its working positions by the second punch 14 as this punch becomes engaged inside one opening 9 of the horizontal guide plate 7. The raising of this punch 14 to its blocking position is controlled by the same mechanism which is provided for effecting the stepwise forward movement of the working head. This mechanism comprises a manually operated actuating lever 15 which is keyed onto a shaft 16 rotatably mounted inside the body 17 of the working head 10. The shaft 16 is linked by two short crank-arms 18 with a sliding member 19 which is mounted inside the working head so as to slide vertically therein. This sliding member 19 drives, through another pair of crank-arms 20, a pawl 21 which is intended to engage successively in each opening 9 of the guide plate 7, so as to push the movable working head 10 in the direction of the arrow F for moving this head stepwise from one working position to the next one. The sliding member 19 also has a further function, which is to raise the second punch 14. This punch 14 has two different roles, namely:

acting as a blocking member for immobilizing the working head in each of its working positions;

acting as an anvil for the heads of the clamps 4 of a staple during the final crimping of the spikes of a clamp.

According to the main feature of this invention, the motions of the upper die 11 and of the punch 13 are controlled by a sliding member 22 driven by the piston 23 of an actuator cylinder 24, operated hydraulically or pneumatically.

Before describing this driving mechanism, it will be appropriate to point out that the upper die 11 is carried by an L-shaped bracket 25, the foot 26 of which is mounted inside the body 17 of the working head 10 so as to slide vertically therein. The clamp-driving punch 13 is also slidable vertically along axis X-X' inside a bore 27 formed in the body 17 of the working head.

The actuating sliding member 22 is disposed at a right angle relatively to the sliding axis Y-Y' of the working head 10. This sliding member 22 is arranged for sliding along an axis Z-Z' which is parallel to the guide plate 7 and at the same time perpendicular to the sliding axis X-X' of punch 13.

The sliding member 22 is driven by the piston 23 of the cylinder 24 through a toggle lever 28-29, the knuckle shaft 30 of which is linked by a short crank-arm 31 with the body 17 of the working head. The linkage thus formed between the cylinder piston 23 and the sliding member 22 will thus constitute a toggle mechanism.

The sliding member 22 carries two separate cams which are intended for respectively driving the movable upper bracket 25 and the first punch 13. These two cams are designed in such manner that they will operate successively, one after the other, so that the upper die 11 will be lowered before the raising of the punch 13.

The first cam consists in a slot 33 formed in the sliding member 22. Inside this slot is engaged a shaft 34 carrying a roller, this shaft being carried between the two arms of a yoke 35 formed on the lower end of the foot 26 of the movable bracket 25. The slot 33 is elbow-shaped, with a first arm 33a extending upwardly obliquely towards the guide-plate 7, and, on the opposite side, a second arm 33b which extends horizontally.

The second cam provided on the actuating sliding member 22 consists in a groove 36 formed in the side of this sliding member which is facing the punch 13, these two parts 22 and 13 being offset relatively to each other. The groove 36 extends obliquely and its lower end opens along the free edge of the vertical plate which constitutes the sliding member 22 (see FIG. 2).

In registry with the inlet to this groove 36, the foot 37 of the first punch 13 carries a roller 38 rotating about a shaft 39. This roller is intended to enter the groove 36 when the sliding member 22 is moved towards the punch 13, so that it will then push the punch 13 upwards.

The operation of the apparatus is as follows:

(1) Changing the position of the working head

After the working head has been moved from one working position to the next by means of the hand lever 15, the second punch 14 is in its raised position, shown in FIG. 4.

Figure 2:
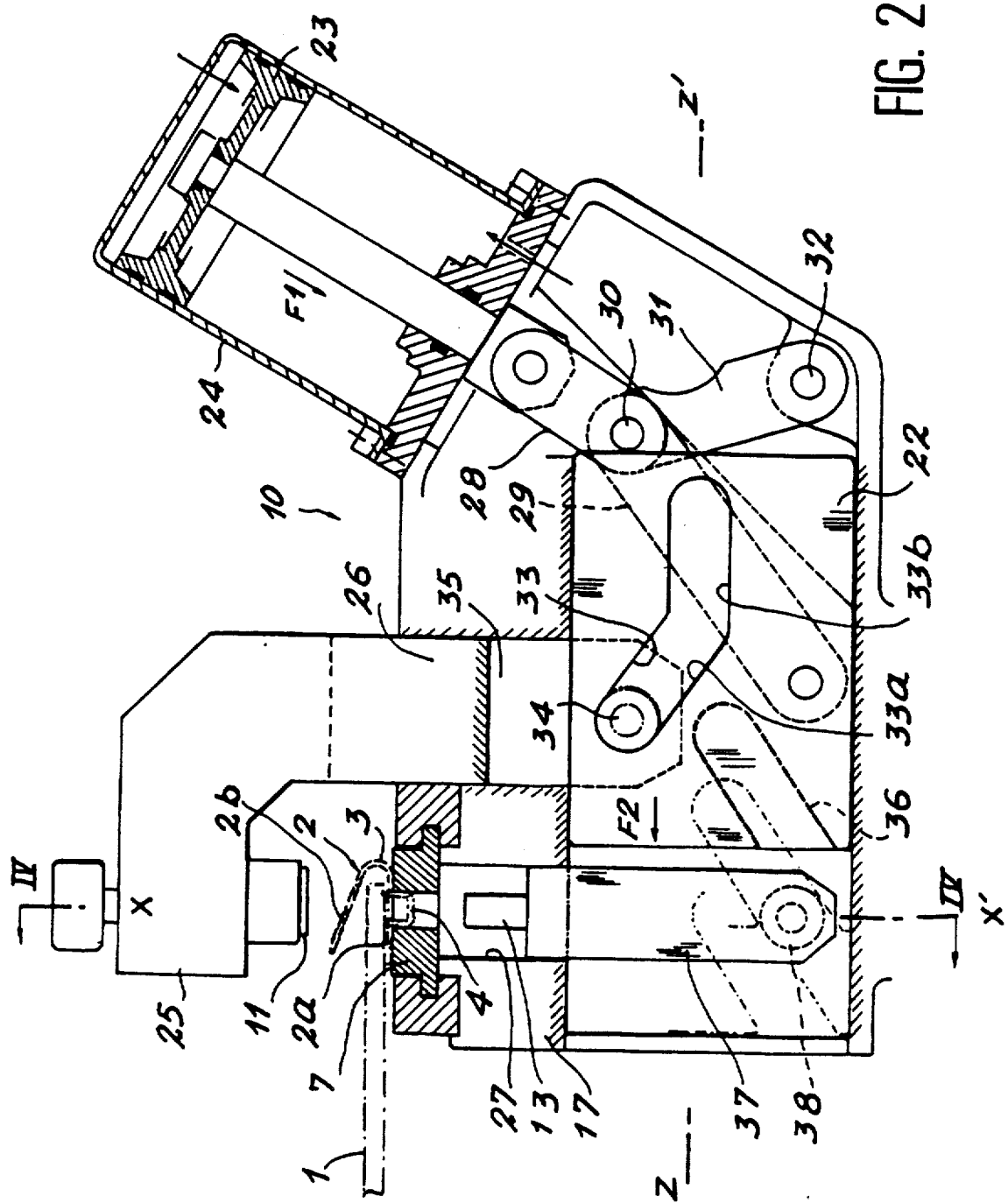
FIG. 2 is a cross-section view taken along line II—II of FIG. 1, on an enlarged scale, the mobile tools of the working head being shown in the waiting position.
Figure 3:
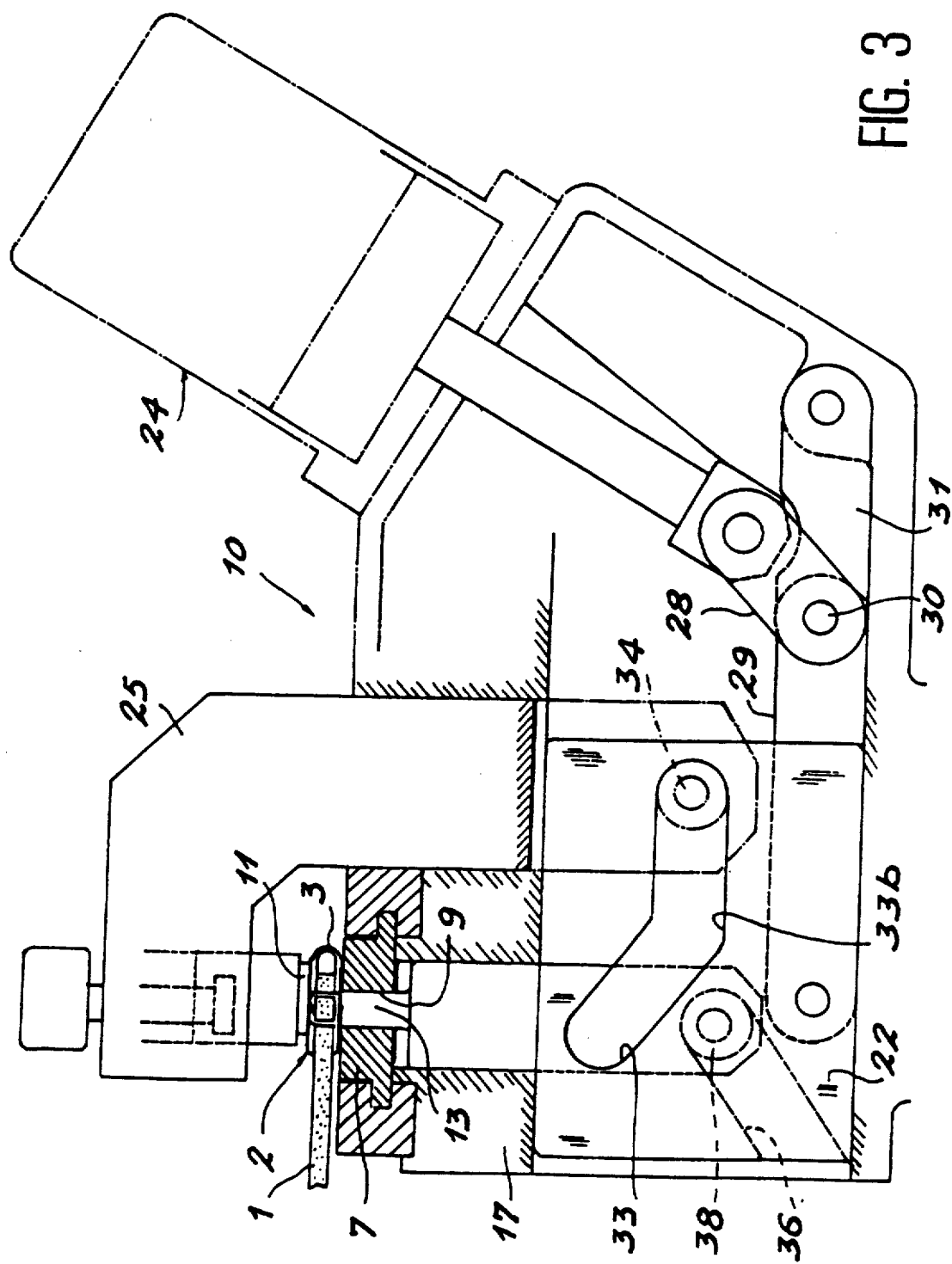
FIG. 3 is a cross-sectional view similar to FIG. 2, in which, however, the mobile tools are shown in their working position.

All the other movable members of the working head are then in their waiting position, shown in FIG. 2.

As a result, the bracket 25 is in its raised position, while the first punch 13 is in its lowered position. The sliding member 22 is in its rearmost position towards the actuator cylinder 24 and the piston 23 of this cylinder is retracted.

It will be appropriate to point out that the shaft 34 carried on the foot 26 of the bracket 25 will then rest in the upper end of the elbow-shaped slot 33 forming the driving cam. The roller 38 carried by the foot 37 of the first punch 13 will then be outside the groove 36 which forms the cam for driving punch 13, but this roller 38 will be in registry with the opening of groove 36.

(2) Closing down a staple

Upon the actuator cylinder 24 being energized, the piston 23 will extend in the direction of arrow F1. The piston will thus push the sliding member 22 in the direction of arrow F2, through the toggle linkage 28-29-31.

In the first phase of the movement of the sliding member 22, this movement will cause the bracket 25 to be lowered, through the intermediary of the cam constituted by the elbow-shaped slot 33. As a result, the die 11 will then come to rest against the raised arm 2b of the corresponding staple 2 for folding down this arm and closing it against the end of the belt 1.

(3) Simultaneous crimping of the spikes of the clamps of the previous staple

At the same time as it folds down the arm 2b of a staple 2, the lowering of the die carries out the final crimping of the spikes of the fastener clamps 4 carried by the previous staple 2. During this operation, the head of these clamps rests against the second punch 14 which will then have already been raised.

(4) Driving-in the clamps into the staple which has just been closed

A further movement of the sliding member 22 in the direction of arrow F2 will cause the roller 38 carried on the foot 37 of the first punch 13 to become engaged in the groove-shaped cam 36 of this sliding member 22. Due to the slanting arrangement of this groove, the further displacement of the sliding member 22 will raise the punch 13 and thus the driving-in of the clamps 4 of the staple concerned. The spikes of these clamps will thus be driven into the holes formed in the upper arm 2b of the corresponding staple 2.

(5) Partial folding down of the spikes of the clamps

As the sliding member 22 moves further towards the end of its stroke, this causes the punch 13 to push the corresponding clamps 4 further, until their spikes engage the grooves formed in the movable die 11 in registry therewith. This causes these spikes to be partly folded down over 45°.

(6) Return of the working head in the waiting position and forward movement along a further step The return movement is driven by the retracting of the piston 23 in the cylinder 24, while the punch 13 is pushed back towards its lowermost position by a spring 41. This movement brings back the whole set of movable members into their waiting position shown in FIG. 2, except for the second punch 14 which is associated with the stepwise progression mechanism.

This mechanism can then be actuated by means of the hand lever 15 for moving the working head 10 to its next working position.

Apart from this step, it will suffice for the operator to control the operation of the movable head 10 in each one of its working positions. This control step may consist in manipulating an inverter valve (not shown) controlling two ducts connected to the cylinder 24. The inversion of the flow controlled by this valve may take place automatically when the sliding member 22 has reached the end of its stroke towards the guide plate 7.

As a result, the operator is no longer required to exert a physical effort for fixing a row of staples 2 on the end of a conveyor belt 1. In fact, the working head of the apparatus according to this invention is able to carry out the sequence of needed operations by means of mechanical arrangements which are relatively simple and inexpensive, and also have the advantage of being highly reliable. Moreover, the design of these mechanical linkages brings about a large reduction ratio of the efforts being exerted. As a result, it becomes possible to use an actuator cylinder having a relatively small power. On another hand, the apparatus achieves a much greater regularity of the driving-in of the fastener clamps and of the crimping of their spikes, when compared with the situation in which these operations are done manually.

The invention is obviously not restricted to the above-described embodiment, since many modifications may be envisioned. For instance, the mechanism for moving the working head stepwise might be driven by hydraulic or pneumatic means, such as those which actuate the working head 10, and the drive of this stepping mechanism might be associated with the working head drive by means of a programming system controlling the sequence of operations, on the one hand for controlling the stepwise motion of the working head 10 along the guide plate, and on the other hand for actuating this head in each one of its working positions.

What is claimed is:

1. A stapler apparatus for fixing on an end of a conveyor belt a row of junction staples provided with fastener clamps placed in a waiting position, by means of a working head slidably mounted on a guide plate provided for guiding said clamps and comprising on opposite sides of the row of staples having to be fixed a punch for driving-in the clamps and a movable die intended for folding down the clamp spikes, the apparatus further comprising a lead pawl for driving the working head in a stepwise motion in registry with the staples which have to be sequentially fastened, wherein:

the punch (13) for driving-in the clamps (4) and the bracket (25) carrying the movable die (11) are actuated by a sliding member (22) slidably mounted inside the working head (10), said sliding member (22) being driven by the piston (23) of a pneumatic or hydraulic actuator cylinder (24);

said sliding member (22) comprises two separate cams (33 and 36) for respectively driving the support (25) of the movable die (11) and the clamp-driving punch (13), the arrangement and the profile of said cams being such that the first cam (33) will operate at first for driving the movable die (11) downward before the second cam (36) raises the clamp-driving punch (13).

2. A stapler apparatus according to claim 1, wherein the travel axis (Z-Z') of the sliding member (22) lies parallel to the plane of the guide plate (7) intended for supporting an end (1) of a conveyor belt, this travel axis (Z-Z') being at the same time perpendicular to the sliding axis (Y-Y') of the working head (10) along said guide plate (7).

3. A stapler apparatus according to claim 1, wherein the piston (23) of the actuator cylinder (24) drives the sliding member (22) through the intermediary of a toggle linkage (28-29), the knuckle axis (30) of which is linked through a short crank-arm (31) with the body of the working head (10).

4. A stapler apparatus according to claim 1, wherein the support for the movable die (11) is a bracket (25), the foot of which is slidable inside the working head (10) for being coupled with the corresponding control cam (33) provided on the sliding member (22).

5. A stapler apparatus according to claim 4, wherein the cam (33) provided for driving the bracket (25) carrying the movable die (11) is in the form of an elbow-shaped groove or slot (33) provided in the sliding member (22), a pin (34) carried on the foot (26) of said bracket (25) being engaged inside said groove or slot (33).

6. A stapler apparatus according to claim 1, wherein the cam (36) provided for driving the clamp-driving punch (13) consists in a groove or slot (36) extending obliquely in the sliding member (22) and adapted for receiving a roller (38) carried on the foot (37) of said punch (13).

7. A stapler apparatus according to claim 1, wherein the movable die (11) comprises two separate portions adapted for bearing at two different stages upon the spikes of the fastener clamps (4) provided for fastening two successive staples (2), characterized in that there is provided, in addition to the punch (13) provided for driving-in the fastener clamps (4) into one of said staples (2), a second punch (14) adapted for serving as an anvil for supporting the head of the fastener clamps (4) of the previous staple (2), said second punch (14) being the first one to be brought into its working position by the activation of the stepping lead mechanism of the working head (10) with which mechanism this punch (14) is associated.

* * * * *